3,458,603
POLYMERIC STYRENE OR ALKYL METHACRY-
LATE COPOLYMERS MADE BY 3-STAGE GRAN-
ULAR POLYMERIZATION PROCESS
Brian Philip Griffin, Welwyn Garden City, England, assignor to Imperial Chemical Industries Limited, London, England, a corporation of Great Britain
No Drawing. Filed Nov. 25, 1966, Ser. No. 596,775
Claims priority, application Great Britain, Dec. 10, 1965, 52,528/65
Int. Cl. C08f 15/40, 1/11
U.S. Cl. 260—881
13 Claims

ABSTRACT OF THE DISCLOSURE

Craze resistant methyl methacrylate or styrene copolymers are prepared by an aqueous granular polymerization process. The process is a three stage process comprising (1) aqueous granular polymerization of styrene or methylmethacrylate followed by (2) aqueous granular polymerization of alkyl acrylate and cross-linking monomers followed by (3) aqueous granular polymerization of styrene or methyl methacrylate.

---

The present invention relates to improvements in the production of thermoplastic polymeric materials, particularly such materials in a form suitable for injection moulding.

Polymethyl methacrylate is widely used in the form of granules of moulding powder to manufacture useful articles by, for example, injection or extrusion processes. Among the many articles which may be made from this material are, for example, reflex reflectors, rear lamp housings for motor vehicles, telephones, implosion guards for television tubes, vacuum jugs, fountain pens and lighting fittings. Articles such as these moulded from polymethyl methacrylate granules or moulding powders are widely used at the present time and give extremely satisfactory service.

Polystyrene is a material which is used in injection moulding processes to produce many kinds of useful articles. Although polystyrene does not have the resistance to the effect of light possessed by polymethyl methacrylate, it is, nevertheless, an important commercial material.

Although both these materials have great utility, their versatility could be increased if they could be made more resistant to impact or to crazing, or possibly to both at the same time. "Crazing" is the name given to the phenomenon that is characterised by the appearance of fine lines on the surface of the polymer when it is exposed to solvents or subjected to repeated exposure to aqueous detergents.

Accordingly we provide a process that comprises polymerising by an aqueous granular polymerisation process monomer material (A) consisting of methyl methacrylate and/or styrene together with 0 to 50% by weight of said material (A) of another different copolymerisable monoethylenically unsaturated compound in the presence of an aqueous dispersion (X) obtained by polymerising by an aqueous granular polymerisation process monomer material (B) consisting of one or more alkyl esters of acrylic acid in which the alkyl moiety contains 1 to 8 carbon atoms and from 0.01 to 10% by weight of said material (B) of one or more copolymerisable ethylenically unsaturated compounds containing two or more >C=C< groups per molecule and from 0 to 50% by weight of said ester of acrylic acid of another different copolymerisable monoethylenically unsaturated compound, said material (B) having been dispersed in a dispersion (Y) obtained by polymerising by an aqueous granular polymerisation process monomer material (C) consisting of methyl methacrylate and/or styrene together with 0 to 50% by weight of said material (C) of another copolymerisable monoethylenically unsaturated compound, the proportions of the monomeric components of the materials (A), (B) and (C) being such that in the final polymer there is from 5 to 40% by weight of polymeric units derived from material (B) and correspondingly from 95% to 60% by weight of polymeric units derived from materials (A) and (C) taken together.

Examples of said "another different copolymerisable monoethylenically unsaturated compound" that may be used in the monomers (A) and (C) include: methyl acrylate, ethyl acrylate, propyl acrylate, butyl acrylate, 2-ethyl-hexyl acrylate, methacrylic acid, acrylamide, methacrylamide, alkyl substituted styrenes, e.g. α-methyl styrene, halogen substituted styrenes, e.g. α-chlorostyrene, acrylonitrile, methacrylonitrile, N-phenyl maleimide, N-(2-chloro-phenyl) maleimide, acrylic acid, crotonic acid, maleic acid, fumaric acid, itaconic acid, 2-vinyl pyridine, 4-vinyl pyridine, and vinyl phthalimide. For most purposes it is preferred that there should be no additional monomers of this kind in materials (A) and (C), but where there is a reason for including one or more of these monomers it is preferred that the amount present should not exceed 15% by weight of the mixture (A) or (C), except that where a mixture of styrene and acrylonitrile is used, it is normally preferred to use larger amounts of acrylonitrile than 15%, e.g. a monomer mixture of 75% styrene and up to 25% acrylonitrile may be used. The presence of these additional monomers sometimes allows special effects to be obtained; for example it may be possible to increase the transparency of the product by including certain additional monomers.

Examples of the acrylic acid ester components of material (B) include: methyl acrylate, ethyl acrylate, propyl acrylate, butyl acrylate and 2-ethyl-hexyl acrylate, and as polyfunctional polymerisable compounds glycol dimethacrylate, diethylene glycol dimethacrylate, triethylene glycol dimethacrylate, divinyl benzene, vinyl methacrylate, methylene dimethacrylate, allyl methacrylate, diallyl phthalate, diallyl maleate, allyl acrylate, methallyl acrylate, butadiene-1,3, isoprene and 2-chloro butadiene. Additional monoethylenic monomeric materials which may usefully be present in proportions of up to 50% by weight of the alkyl acrylate include for example methyl methacrylate, methacrylic acid, acrylamide, methacrylamide, styrene, alkyl substituted styrenes, e.g. α-methyl styrene and α-chlorostyrene, acrylonitrile, methacrylonitrile, N-phenyl maleimide, N-(2-chloro-phenyl) maleimide, hydroxy ethyl methacrylate, acrylic acid, crotonic, maleic, fumaric and itaconic acids, 2-vinyl pyridine, 4-vinyl pyridine, N:N-dimethylaminoethyl methacrylate, vinyl phthalimide, N-tert-butyl acrylamide and di-N-ethyl acrylamide.

The polymerisation process of our invention is a granular polymerisation process which is a process that is well known in the polymer art, and normally consists in dispersing a liquid monomer in an aqueous phase with stirring to form a dispersion of monomer droplets in the aqueous phase. The suspension is normally stabilised by the presence of a granulating agent, examples of which include gelatin, starch, methyl cellulose, polyvinyl alcohol, salts of polyacrylic and polymethacrylic acids and certain inorganic colloidal materials, e.g. hydrated magnesium silicates. Catalysts that are soluble in the monomer are also used, examples of which include benzoyl peroxide, lauroyl peroxide and the azo catalysts of which αα′-azodiisobutyronitrile is an example. The granular polymerisation process is to be distinguished from an emulsion polymerisation process in which the monomer droplets are maintained in emulsified form by an emulsifying agent and the product is a stable emulsion. In the process of this invention the product is an unstable dispersion of polymer particles in water, and these particles can be isolated by filtration.

In preparing the polymers used in the present process, or in carrying out the process, the molecular weight of the polymers may be controlled in known manner in order to ensure that the melt viscosity of the final product falls within the range required for conventional extrusion moulding techniques, including bottle blowing techniques. A preferred method is to include in the polymerisation mixture a chain transfer agent, particularly for example an aliphatic mercaptan, e.g. lauryl mercaptan, in an amount of from 0.05 to 1.0% by weight of the polymerisable ingredients of the mixture.

The polymerisation mixture in the present process is contained in a stirred reaction vessel which may be sealed, or left open to the atmosphere in which case a reflux condenser should be used, and heated to the desired reaction temperature. The process may be carried out for example, at temperatures of 40–140° C., the most useful range for convenience and speed being from 70–90° C.

It will be seen that the process of the present invention consists in its simplest form in the final polymerisation step of a succession of three granular polymerisation processes, the ingredients for that final step being determined by material A and dispersion X. A further feature of the present invention is the combination of all three granular polymerisation processes, i.e. the initial polymerisation of monomer C to give dispersion Y, the polymerisation of material B in the presence of dispersion Y to give dispersion X, and the polymerisation of material A in the presence of dispersion X.

The amounts of the various ingredients of the process of the present invention may be varied to produce polymers of different properties. As the amount of the polyfunctional monomer that is polymerised in admixture with the lower alkyl acrylate is increased, the impact resistance of the final polymer often increases to a maximum. Normally however, to obtain a good combination of high impact strength, good craze resistance and moulding properties, the amount of polyfunctional monomer used is preferably from 0.5 to 3% by weight of the monomeric mixture containing the alkyl acrylate, i.e. the material B. The weight of polymeric units in the final polymer derived from material B is preferably from 10 to 30% by weight because this range encompasses the most useful combination of mechanical and craze resistant properties. Where these polymeric units approach 30% by weight, the general result is to give a flexible high impact strength material. Where these polymeric units approach 10% by weight the general result is to give a hard stiff material with a good resistance to crazing, and a moderate improvement in impact strength.

The weight of polymeric units formed from material A is preferably equal to or less than the weight of polymeric units formed from material C because if this is not so there is in general a tendency for the impact and craze resistance to be less good even although the same overall amounts of these polymeric units may be present. It is preferred that the weight of polymeric units formed from material A is not less than an amount substantially equal to 10% of the weight of polymeric units formed from material C. For convenience it is generally preferred that the materials A and C should be chemically the same.

In carrying out the present invention other ingredients may also be added to the reaction mixture at any convenient stage, for example, components such as stearic acid or stearyl alcohol which have a favourable effect upon the moulding properties of the final polymer, and stabilsers including antioxidants and ultra-violet light absorbers. Surface active agents, emulsion polymer coagulating agents and aqueous phase inhibitors can be used to control the size and nature of the polymer particles.

The dispersed polymer particles resulting from the process of the present invention are normally solid, roughly spherical particles of polymer having a weight average particle size of 50 to 1000 microns. They can be separated from the aqueous phase by filtering or by centrifuging, and after washing and drying they may be used for moulding purposes in that form. Alternatively, they may be converted to a granular form, e.g. by extruding the powder to form laces or rods and cutting the laces or rods into short lengths. This second stage may be carried out when it is desired to compound the powder with pigment to form a pigmented moulding material.

The moulding powders or granules made according to the invention may be used in the production of many different kinds of useful articles and components by shaping, moulding, extruding or injection moulding. Because of their particularly good resistance to crazing when brought into contact with aqueous detergents they can be used in the manufacture of such articles as wash hand basins, baths and sinks. Articles moulded from the polymeric materials also possess superior weathering properties. Components made from our products may form parts of other finished articles.

The present invention is more particularly described in the following examples in which all parts are given by weight.

EXAMPLES 1 TO 10

Each of these examples was carried out in the following manner. Details concerning the monomers used in these examples together with certain properties of the final polymers are given in Table 1 following the end of the process detail. In each example there were three polymerisation stages and these are referred to as Stage I, Stage II and Stage III, the process of each example being carried out in the numerical order of the three stages.

Stage I

To a flask fitted with a reflux condenser were added the following ingredients:

| | Parts |
|---|---|
| Water | 1330 |
| 1% (by weight) aqueous solution of sodium polymethacrylate | 80 |
| 10% aqueous solution of Pluronic F68 (Supplied by Wyandotte Chemical Corp. and understood to be a polyethylene oxide/polypropylene oxide condensate | 2.7 |
| $Na_2HPO_4$ | 0.4 |
| $\alpha\alpha'$-azo-diisobutyronitrile | 1.5 |
| Lauryl mercaptan | 3.8 |
| Monomer mixture I | 670 |

The mixture was agitated vigorously and heated to reflux (70–85° C.) under atmospheric pressure. After two hours, when the vigorous exothermic reaction had subsided, the contents of the flask were heated to 99° C. for 15 minutes and then cooled.

Stage II

To the flask containing the product of Stage I at 50° C. was added a mixture of the following:

| | Parts |
|---|---|
| Monomer or monomer mixture II | 192 |
| Glycol dimethacrylate | 8 |
| $\alpha\alpha'$-azo-diisobutyronitrile | 0.8 |
| $\alpha\alpha'$-azo-dicyclohexane carbonitrile | 0.4 |

The mixture was heated to reflux under a blanket of nitrogen with vigorous stirring. After one hour, when the vigorous reaction had subsided, the mixture was heated to 98° C. for one hour, then cooled to 60° C. and 30 parts of 1% (by weight) aqueous solution of sodium polymethacrylate were added.

TABLE 1

| Example No: | Monomers and amounts used in each Stage | | | Full vicat softening point, °C. | Area crazed, percent | Crazing stress, percent | Falling weight impact strength, ft./lbs. | Appearance of moulding |
|---|---|---|---|---|---|---|---|---|
| | Stage 1, Monomer Mixture I | Stage II, Monomer or monomer mixture II | Stage III, Monomer mixture III | | | | | |
| 1 | Methyl methacrylate 650 parts; ethyl acrylate 20 parts. | n-Butyl acrylate 192 parts | Methyl methacrylate 220 parts; ethyl acrylate 6 parts. | 108.8 | 35 | 45 | 0.93 | Translucent. |
| 2 | do | Ethyl acrylate 192 parts | do | 109.2 | 35 | 42 | 0.87 | Do. |
| 3 | do | 2-ethyl hexyl acrylate 96 parts; n-Butyl acrylate 96 parts. | do | 109.4 | 60 | 54 | 0.6 | Opaque. |
| 4 | do | Ethyl acrylate 96 parts; n-Butyl acrylate 96 parts. | do | 109.1 | 15 | 51 | 0.75 | Translucent. |
| 5 | do | n-Butyl acrylate 167 parts; acrylonitrile 25 parts. | do | 107.2 | 30 | 51 | 0.25 | Do. |
| 6 | do | n-Butyl acrylate 167 parts; styrene 25 parts. | do | 110.3 | 38 | 55 | 0.75 | Transparent. |
| 7 | Methyl methacrylate 603 parts; N-o-chlorophenyl maleimide 67 parts. | n-Butyl acrylate 192 parts | Methyl methacrylate 204 parts; N-o-chlorophenyl maleimide 23 parts. | 120.5 | 40 | 59 | 1.71 | Translucent. |
| 8 | Methyl methacrylate 603 parts; styrene 67 parts. | do | Methyl methacrylate 203 parts; styrene 23 parts. | 110.2 | 0 | 68 | 0.6 | Opaque/translucent. |
| 9 | Methyl methacrylate 637 parts; acrylonitrile 33 parts. | do | Methyl methacrylate 215 parts; acrylonitrile 11 parts. | 106.1 | 40 | 59 | 1.71 | Do. |
| 10 | Styrene 502 parts; acrylonitrile 168 parts. | n-Butyl acrylate 167 parts; acrylonitrile 57 parts. | Styrene 169 parts; acrylonitrile 57 parts. | 104.6 | 0 | 72 | 0.6 | Opaque. |
| | A commercial polymethyl methacrylate moulding powder made by a granular polymerisation process | | | 110 | 100 | 0 | <0.5 | Transparent. |

Stage III

To the flask containing the product of Stage II was added the following mixture:

| | Parts |
|---|---|
| Monomer mixture III | 226 |
| αα′-azodiisobutyronitrile | 0.5 |
| Lauryl mercaptan | 2.2 |

The mixture in the flask was then heated to reflux (75–85° C.) under a blanket of nitrogen with vigorous stirring. After 1½ hours, when the exothermic reaction had ceased, the mixture was heated to 97° C. for 45 minutes. After cooling, the product was centrifuged, washed, and dried. The polymer particles were injection moulded into specimens in the form of circular discs 4.5-inch diameter x ⅛-inch thick and also in the form of strips 5-inch x ½-inch x ⅛-inch.

The area crazed test was carried out by first immersing the injection moulded strips in a 1% commercial detergent consisting of an alkyl phenol alkylene oxide condensate for 24 hours at 65° C. The strip was then dried over silica gel for 24 hours. The cycle of immersion and drying was repeated once. The surface of the moulding was then painted with 100% detergent and heated at 65° C. for 25 minutes in an air oven. The specimen was then washed and dried and an estimate made of the proportion of surface area of the moulding that showed crazing cracks.

In carrying out the crazing stress test, strips were cut from the injection moulded 4.5 inch diameter specimens each 0.7-inch x ⅛-inch x 4.25-inch. The longest edges of the strips were milled flat and parallel. The strips were then immersed in a 5% solution of the same commercial detergent consisting of an alkyl phenol alkylene oxide condensate for 5 hours at 65° C. After being allowed to drain for 10 minutes the strips were clamped at one end in a horizontal position and a steel knife edge support was placed underneath each strip and across its length one inch from the clamped end. A load of 1000 g. was hung from the other end of the strip for 16 hours. At the end of this time the position of the crazing boundary was noted and the stress at this point calculated. The results were expressed as a percentage of the stress required to craze "Perspex" polymethyl methacrylate sheet (made by the bulk casting process) under the same conditions. The crazing stress value for "Perspex" polymethyl methacrylate sheet would thus be 100%.

EXAMPLES 11 TO 15

The form of these examples follows that of Examples 1 to 10, in that there is first given a general description of the process of each example, an dthen Table 2 providing the final details together with properties of the final polymer. In each example, there were three polymerisation stages, Stages I, II and III.

Stage I

To a flask fitted with a reflux condenser and stirrer were added:

| | Parts |
|---|---|
| Water | 1330 |
| 1% (by weight) aqueous solution of sodium polymethacrylate | 80 |
| 10% (by weight) aqueous solution of Pluronic F68 | 2.7 |
| Na₂HPO₄ | 0.4 |
| αα′-Azo-diisobutyronitrile | 2.0 |
| Lauryl mercaptan | (¹) |
| n-Butyl acrylate | (¹) |
| Methyl methacrylate | (¹) |

¹ In amount specified in Table 2 hereinafter.

The mixture was heated to reflux (80–82° C.) and after the reaction had subsided (11½ hours), the mixture was heated to 99° C. for 15 minutes, cooled to 50° C. following which were added 670 parts of water and 4 parts of a 10% (by weight) aqueous solution of Pluronic F68.

Stage II

To the flask containing the product of Stage I was slowly added the following mixture of ingredients:

| | Parts |
|---|---|
| n-Butyl acrylate | 192 |
| Glycol dimethacrylate | 8 |
| αα'-Azo-diisobutyronitrile | 0.8 |
| αα'-Azo-dicyclohexane carbonitrile | 0.4 |

After heating to reflux under a blanket of nitrogen for ½ to 1 hour, the exothermic reaction was completed. The mixture was then heated to 98° C. for 1 hour and then cooled to 60° C.

Stage III

To the flask containing the product of Stage II were added 30 parts of a 1% (by weight) aqueous solution of sodium polymethacrylate, followed by a solution of 1 part of αα'-azo-diisobutyronitrile dissolved in a mixture of lauryl mercaptan, methyl methacrylate and n-butyl acrylate each in amounts specified in the table hereinafter. The mixture was heated to reflux (75–85° C.) for ½ to 1½ hours until the reaction had subsided. It was thereafter heated to 97° C. for 45 minutes, cooled and the product centrifuged, washed, filtered and dried. Mouldings were prepared as in the foregoing examples.

subsided (1–1½ hours) the reaction mixture was heated to 105° C. for 20 minutes. The mixture was then cooled to 30° C.

Stage II

To the product of Stage I was added a mixture of 20,000 parts of water and 120 parts of a 10% (by weight) aqueous solution of Pluronic F68. There was then added a mixture of n-butyl acrylate, styrene and glycol dimethacrylate in amounts shown in Table 3 hereinafter, together with αα'-azo-diisobutyronitrile (39 parts) and αα'-azo-cyclohexane carbonitrile (19.5 parts). The mixture was heated to 80° C. under nitrogen and held at this temperature until it had subsided (1–2 hours). The mixture was then heated to 105° C. for 20 minutes, and then cooled to 60° C.

Stage III

To the product of Stage II at 60° C. were added the following:

| | Parts |
|---|---|
| Water | 1,000 |
| 1% (by weight) aqueous solution of sodium polymethacrylate | 900 |
| 10% (by weight) aqueous solution of Pluronic F68 | 120 |

TABLE 2

| | Stage I | | | Stage III | | | | | | |
|---|---|---|---|---|---|---|---|---|---|---|
| Example No. | Methyl methacrylate, parts | n-Butyl acrylate, parts | Lauryl mercaptan, parts | Methyl methacrylate, parts | n-Butyl acrylate, parts | Lauryl mercaptan, parts | Vicat softening point, °C. | Crazing stress, percent | Falling weight impact strength, ft./lbs. | Melt viscosity kilopoises at 240° C. 1,120 sec.$^{-1}$ |
| 11 | 777 | 40 | 0.82 | 86 | 4 | 0.1 | 103.2 | 67 | 2.97 | 4.2 |
| 12 | 691 | 36 | 0.85 | 172 | 8 | 0.2 | 104.5 | 73 | 3.03 | 4.4 |
| 13 | 605 | 32 | 1.0 | 258 | 12 | 0.4 | 108.7 | 58.5 | 2.88 | 4.2 |
| 14 | 519 | 28 | 1.04 | 344 | 16 | 0.7 | 105.9 | 67.4 | 2.88 | 4.3 |
| 15 | 432 | 22 | 1.2 | 432 | 22 | 1.2 | 107.5 | 62.5 | 1.56 | 3.6 |

EXAMPLES 16 TO 21

As in the foregoing examples there is first provided a general description of the processes of these examples, which is followed by Table 3 providing the final details and also properties of the final polymers. In these examples there were three polymerisation stages.

Stage I

To an autoclave fitted with a stirrer were added:

| | Parts |
|---|---|
| Water | 40,000 |
| 1% (by weight) aqueous solution of sodium polymethacrylate | 2,400 |
| Na$_2$HPO$_4$ | 30 |
| 10% (by weight) aqueous solution of Pluronic F68 | 80 |
| Methyl methacrylate | 20,980 |
| Ethyl acrylate | 632 |
| αα'-azo-diisobutyronitrile | 43.5 |
| Lauryl mercaptan | 51 |

The mixture was agitated vigorously under a blanket of nitrogen and heated to 80° C. When the reaction had There was then added a mixture of:

| | Parts |
|---|---|
| Methyl methacrylate | 6,993 |
| Ethyl acrylate | 211 |
| αα'-azo-diisobutyronitrile | 35 |
| Lauryl mercaptan | 17 |

TABLE 3

| | Stage II monomer mixture | | | | | | |
|---|---|---|---|---|---|---|---|
| Example No. | Styrene, parts | Glycol dimethacrylate, parts | n-Butyl acrylate, parts | Vicat softening point, °C. | Falling weight impact strength, ft./lbs. | Crazing stress, percent | Light transmission, percent |
| 16 | 328 | 69 | 1,566 | 109 | 0.4 | 7.1 | 91 |
| 17 | 656 | 137 | 3,132 | 110 | 0.4 | (¹) | 86 |
| 18 | 1,106 | 230 | 5,272 | 108 | 0.6 | 33 | 91 |
| 19 | 1,311 | 274 | 6,261 | 111 | 0.9 | 58.4 | 92 |
| 20 | 1,640 | 343 | 7,830 | 109 | 1.5 | (¹) | 91 |
| 21 | 1,969 | 411 | 9,400 | 109 | 3.2 | 59.5 | 88 |

¹ Not measured.

The mixture was heated to 80° C. and held at that temperature until the reaction subsided (½ to 1½ hours). This mixture was then heated to 105° C. for 20 minutes, then cooled, and the polymer isolated as in the preceding examples.

I claim:

1. A process for the production of thermoplastic polymeric materials that comprises polymerising by an aqueous granular polymerisation process monomer material (A) consisting of methyl methacrylate and/or styrene together with 0 to 50% by weight of said material (A) of another different copolymerisable monoethylenically unsaturated compound in the presence of an aqueous dispersion (X) obtained by polymerising by an aqueous granular polymerisation process monomer material (B) consisting of one or more alkyl esters of acrylic acid in which the alkyl moiety contains 1 to 8 carbon atoms and from 0.01 to 10% by weight of said material (B) of one or more copolymerisable ethylenically unsaturated compounds containing at least two >C=C< groups per molecule and from 0 to 50% by weight of said ester of acrylic acid of another different copolymerisable monoethylenically unsaturated compound, said material (B) having been dispersed in a dispersion (Y) obtained by polymerising by an aqueous granular polymerisation process monomer material (C) consisting of methyl methacrylate and/or styrene together with 0 to 50% by weight of said material (C) of another copolymerisable monoethylenically unsaturated compound, the proportions of the monomeric components of the materials (A), (B) and (C) being such that in the final polymer there is from 5 to 40% by weight of polymeric units derived from material (B) and correspondingly from 95% to 60% by weight of polymeric units derived from materials (A) and (C) taken together.

2. A process according to claim 1 in which said another different copolymerisable monoethylenically unsaturated compound forming part of monomer (A) is at least one monomer selected from the group consisting of methyl acrylate, ethyl acrylate, propyl acrylate, butyl acrylate, 2-ethyl-hexyl acrylate, methacrylic acid, acrylamide, methacrylamide, α-methyl styrene, α-chlorostyrene, acrylonitrile, methacrylonitrile, N-phenyl maleimide, N-(2-chloro-phenyl) maleimide, acrylic acid, crotonic acid, maleic acid, fumaric acid, itaconic acid, 2-vinyl pyridine, 4-vinyl pyridine, and vinyl phthalimide.

3. A process according to claim 1 in which said another copolymerisable monoethylenically unsaturated compound forming part of said monomer material (C) is at least one monomer selected from the group consisting of methyl acrylate, ethyl acrylate, propyl acrylate, butyl acrylate, 2-ethyl-hexyl acrylate, methacrylic acid, acrylamide, methacrylamide, α-methyl styrene, α-chlorostyrene, acrylonitrile, methacrylonitrile, N-phenyl maleimide, N-(2-chloro-phenyl) maleimide, acrylic acid, crotonic acid, maleic acid, fumaric acid, itaconic acid, 2-vinyl pyridine, 4-vinyl pyridine, and vinyl phthalimide.

4. A process according to claim 2 in which the amount of said another different copolymerisable monoethylenically unsaturated compound forming part of monomer material (A) does not exceed 15% by weight of material (A).

5. A process according to claim 2 in which the amount of said another different copolymerisable monoethylenically unsaturated compound forming part of monomer material (C) does not exceed 15% by weight of material (C).

6. A process according to claim 1 in which said another different copolymerisable monoethylenically unsaturated compound forming part of monomer material (B) and present to the extent of 0 to 50% by weight of said ester of acrylic acid is at least one monomer selected from methyl methacrylate, methacrylic acid, acrylamide, methacrylamide, styrene, α-methyl styrene, α-chlorostyrene, acrylonitrile, methacrylonitrile, N-phenyl maleimide, N-(2-chloro-phenyl) maleimide, hydroxy ethyl methacrylate, acrylic acid, crotonic, maleic, fumaric and itaconic acids, 2-vinyl pyridine, 4-vinyl pyridine, N:N-dimethylaminoethyl methacrylate, vinyl phthalimide, N-tert-butyl acrylamide and di-N-ethyl acrylamide.

7. A process according to claim 1 in which the ethylenically unsaturated compound containing at least two >C=C< groups per molecule is at least one compound selected from the group consisting of glycol dimethacrylate, triethylene glycol dimethacrylate, divinyl benzene, vinyl methacrylate, methylene dimethacrylate, allyl methacrylate, diallyl phthalate, diallyl maleate, allyl acrylate, methallyl acrylate.

8. A process according to claim 1 in which the amount of ethylenically unsaturated compound containing at least two >C=C< groups per molecule present in monomer material (B) is from 0.5 to 3% by weight of monomer material (B).

9. A process according to claim 1 in which the weight of polymeric units derived from material (B) in the final polymer is from 10 to 30% of the final polymer.

10. A process according to claim 1 in which the weight of polymeric units derived from material (A) in the final polymer is equal to or less than the weight of polymeric units derived from material (C).

11. A process according to claim 10 in which the weight of polymerised units derived from material (A) in the final product is not less than an amount essentially equal to 10% of the weight of polymeric units formed from material (C).

12. A process according to claim 1 in which the polymeric units in the final product derived from material (A) and (C) are chemically the same.

13. A process according to claim 1 in which monomeric material (C) is initially polymerised by a granular polymerisation process to form dispersion (Y), monomeric material (B) is thereafter polymerised by a granular polymerisation process while dispersed in dispersion (Y) to form dispersion (X), and monomeric material (A) is thereafter polymerised by a granular polymerisation process while dispersed in dispersion (X).

References Cited

UNITED STATES PATENTS

| | | | |
|---|---|---|---|
| 3,290,265 | 12/1966 | Kaneko | 260—885 |
| 3,251,904 | 5/1966 | Souder et al. | 260—885 |

FOREIGN PATENTS

| | | |
|---|---|---|
| 245,224 | 10/1960 | Australia. |
| 986,865 | 3/1965 | Great Britain. |

MURRAY TILLMAN, Primary Examiner

JOHN T. GOOLKASIAN, Assistant Examiner

U. S. Cl. X.R.

260—882, 883, 884, 885